May 9, 1933.  R. THOMSON  1,907,469
COMBINED GRINDER AND COMPARATOR
Filed Jan. 6, 1932  4 Sheets-Sheet 1
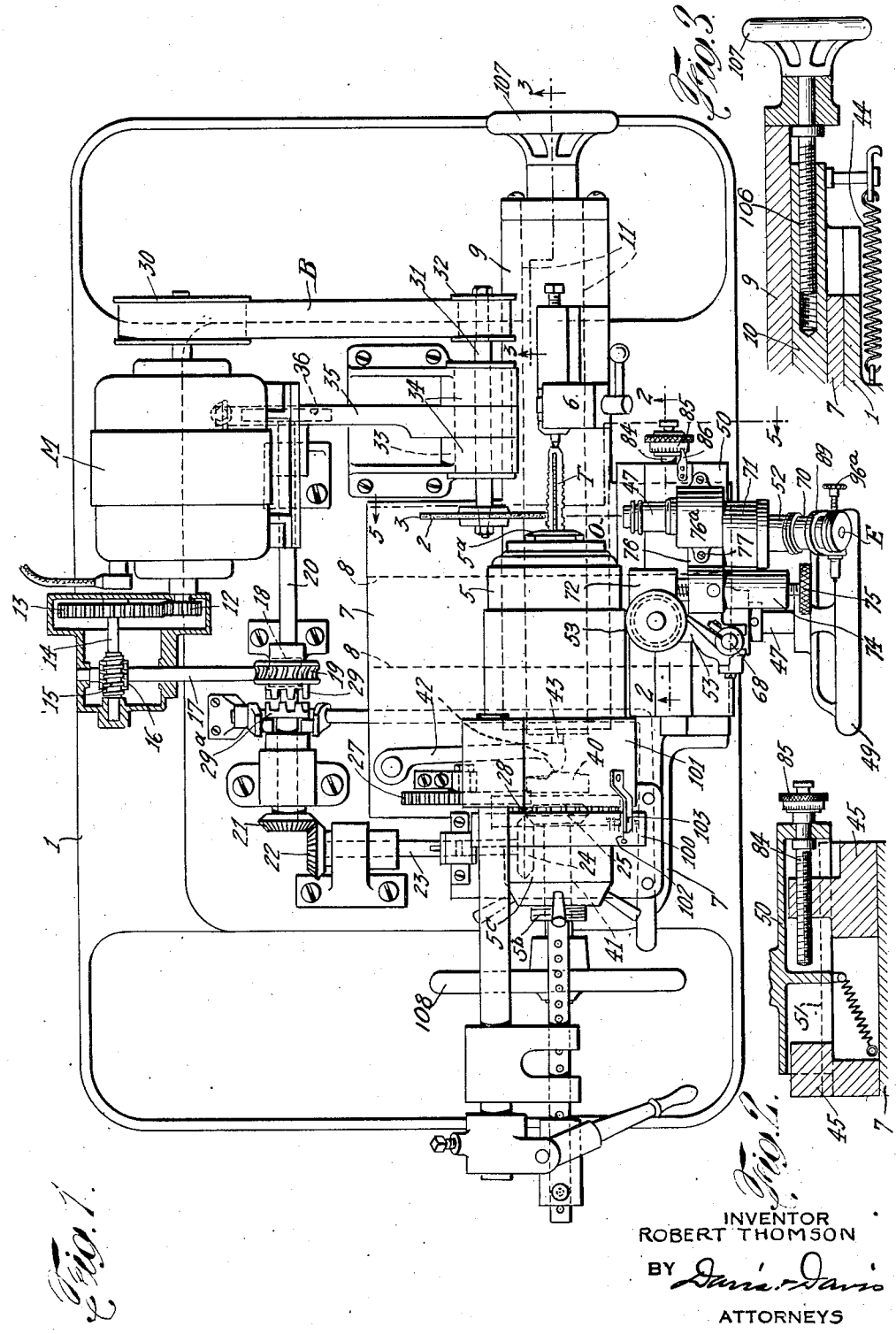
INVENTOR
ROBERT THOMSON
BY
ATTORNEYS

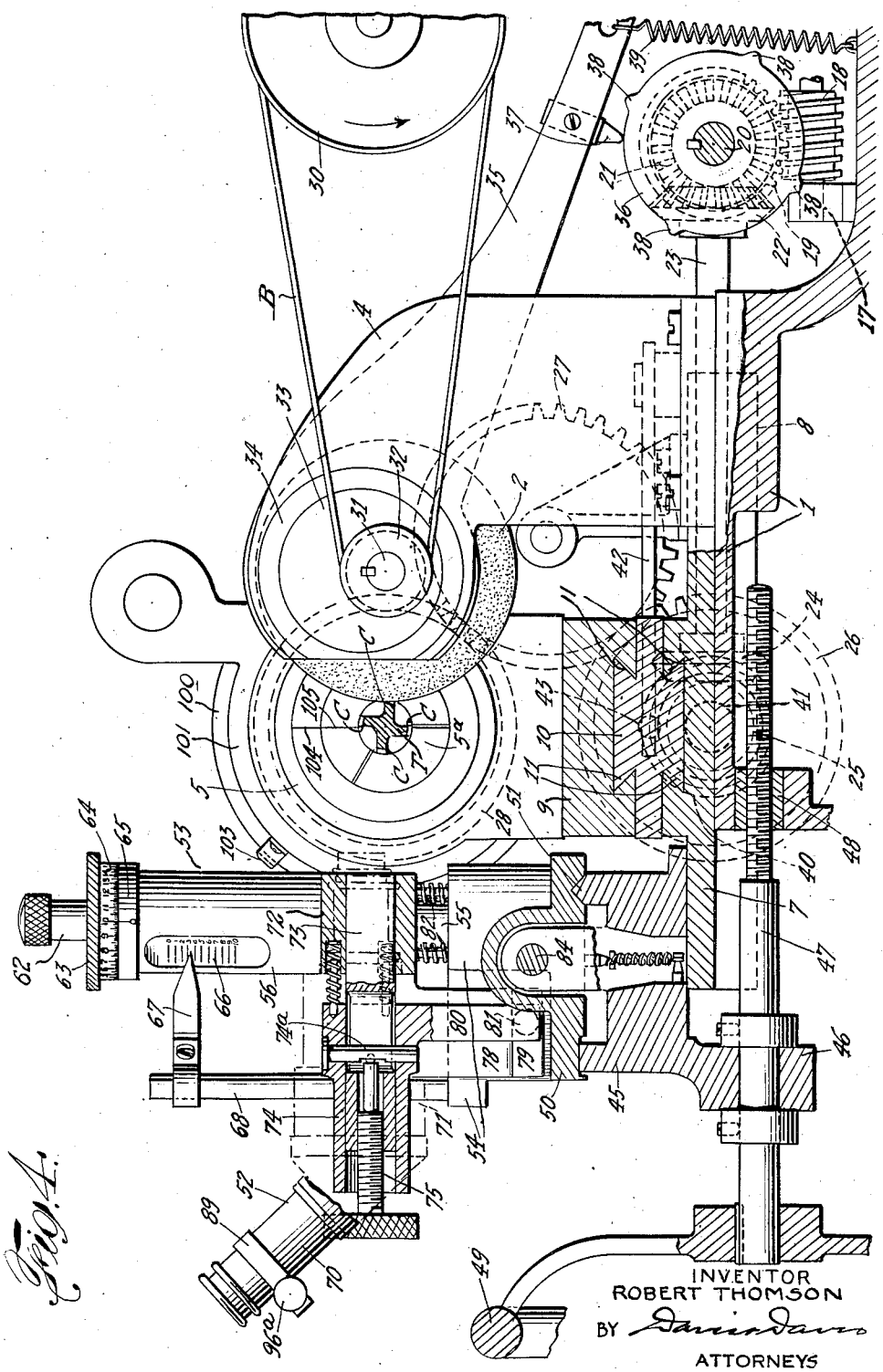

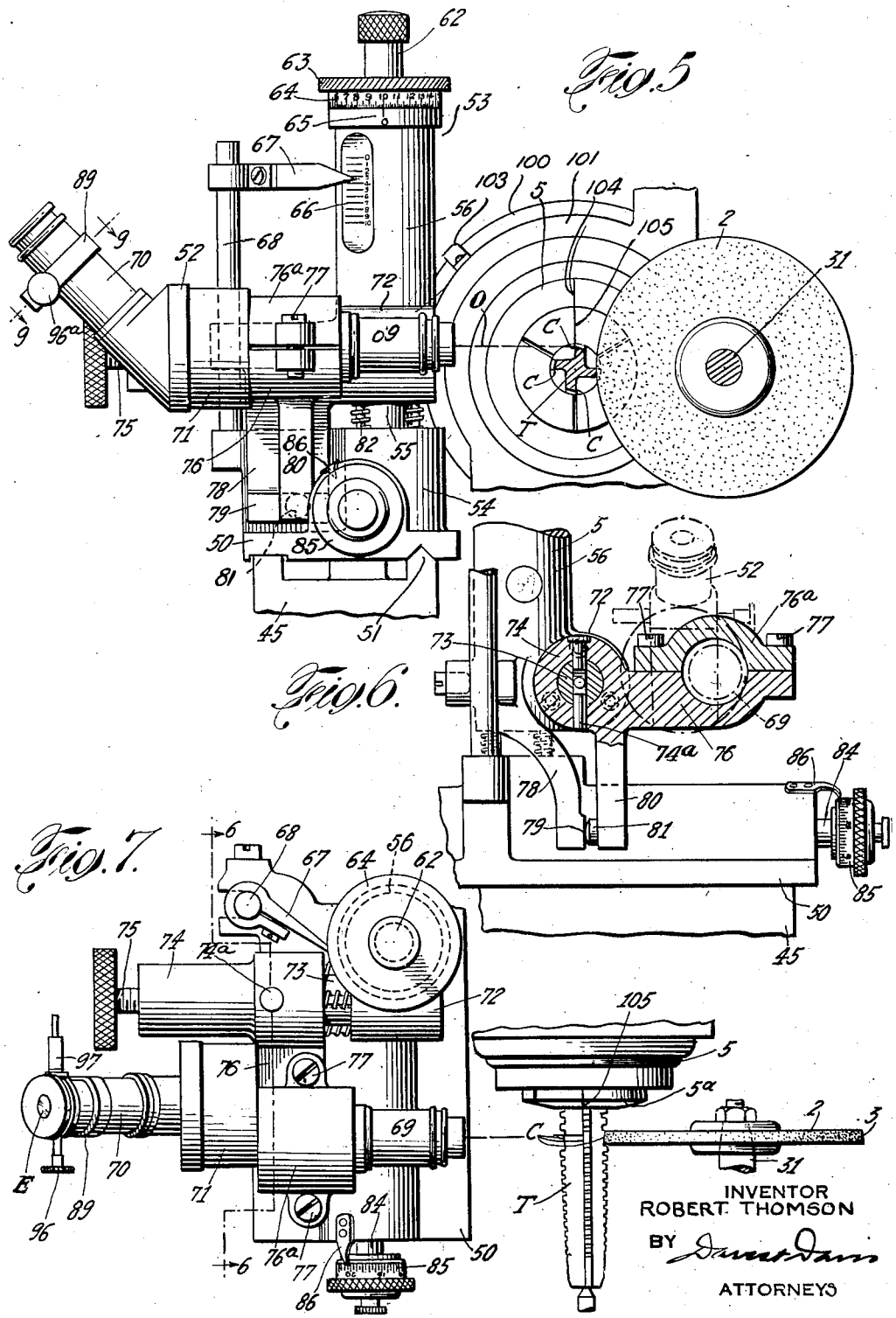

May 9, 1933.  R. THOMSON  1,907,469
COMBINED GRINDER AND COMPARATOR
Filed Jan. 6, 1932   4 Sheets-Sheet 4
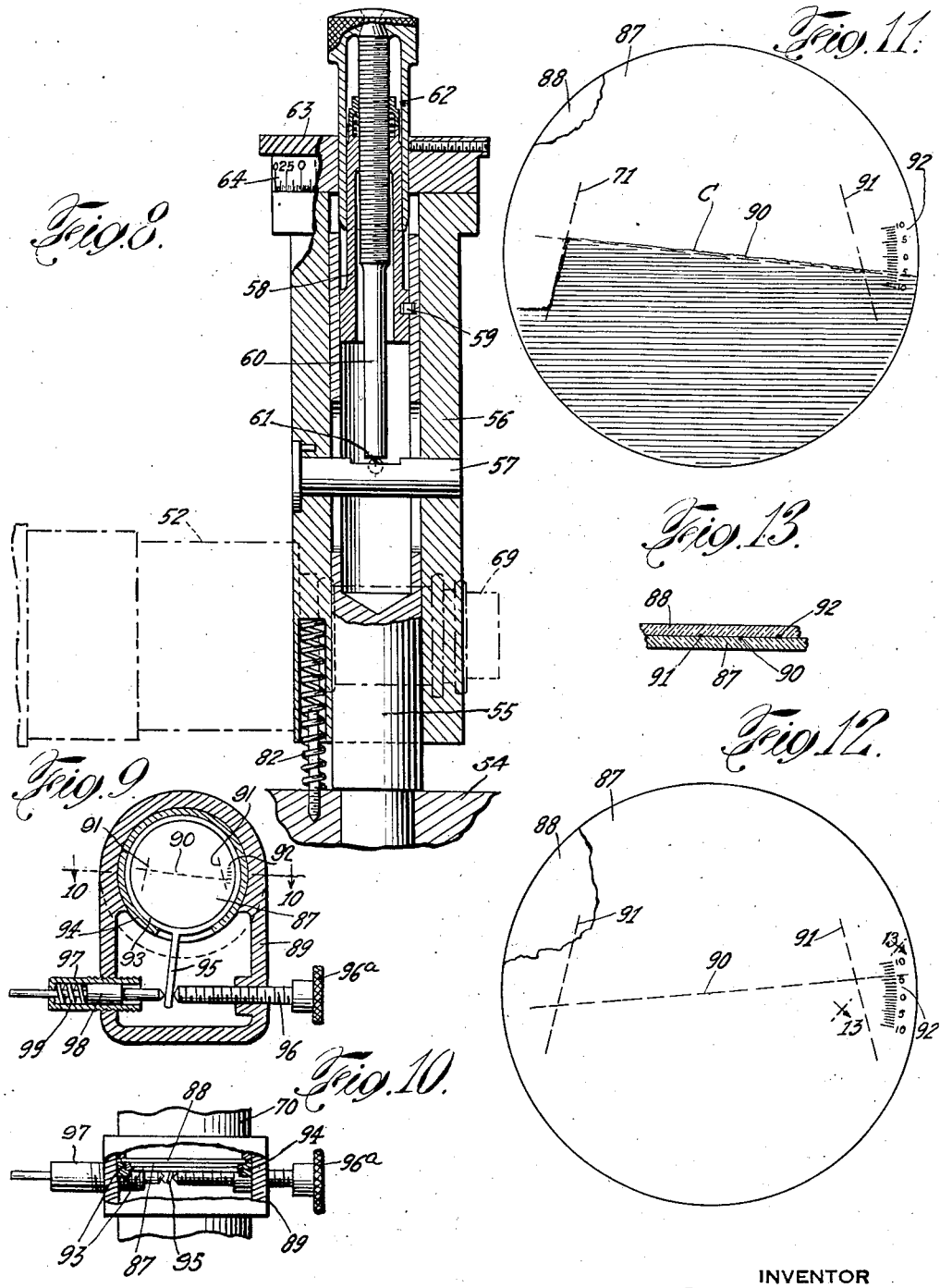
INVENTOR
ROBERT THOMSON
BY
ATTORNEYS Patented May 9, 1933

1,907,469

UNITED STATES PATENT OFFICE

ROBERT THOMSON, OF ARLINGTON, NEW JERSEY, ASSIGNOR TO DARDELET THREAD-LOCK CORPORATION, OF NEW YORK, N. Y., A CORPORATION OF DELAWARE

COMBINED GRINDER AND COMPARATOR

Application filed January 6, 1932. Serial No. 584,938.

Important objects of the present invention are, to provide improved means to accurately compare or measure a work piece while it is supported in a position to be operated upon by a tool; to provide improved means, in combination with a tap-grinding machine, to accurately compare or measure the tap while the latter is supported in the tap-holding chuck of the grinding machine; and to provide an improved comparing and measuring device embodying an adjustable microscopic comparator and micrometer means to cooperate with the comparator.

Other objects of the invention will appear hereinafter.

In the drawings, Fig. 1 is a top plan view of a tap grinding machine embodying my invention;

Fig. 2 a detail vertical section taken on the line 2—2 of Fig. 1;

Fig. 3 a detail vertical section taken on the line 3—3 of Fig. 1;

Fig. 4 an end view showing the tap grinding machine and comparator device partly in section;

Fig. 5 an enlarged vertical section taken approximately on the line 5—5 of Fig. 1;

Fig. 6 a vertical section taken on the line 6—6 of Fig. 7;

Fig. 7 a top plan view showing the comparator device in observational register with a tap supported in the chuck of the grinding machine;

Fig. 8 a vertical sectional view of the micrometer which supports the microscope, the latter being indicated by dotted lines;

Fig. 9 an enlarged section taken on the line 9—9 of Fig. 5;

Fig. 10 a section taken approximately on the line 10—10 of Fig. 9;

Fig. 11 a magnified face view of the comparator means of the microscope as said means appears through the eyepiece of the microscope, a magnified image of the cutting edge of the tap being indicated in comparing relation to the comparator means;

Fig. 12 a view similar to Fig. 11 showing a different adjustment of the comparator means; and Fig. 13 a detail section taken on the line 13—13 of Fig. 12.

In the present disclosure the invention is embodied in a tap grinding machine and it is employed to facilitate the precision grinding of a tap designed for cutting internal screw threads of the well-known Dardelet self-locking type. The invention may be employed to advantage in many other services, however. A Dardelet internal screw thread has a thread rib formed with a locking surface inclined at a low angle with respect to the thread axis for mutual locking coaction with a similarly inclined root surface of a complementary male thread. The complementary threads have grooves materially wider than their ribs to permit relative crosswise displacement of the engaged threads upon screwing without axial advance and this crosswise displacement brings the inclined crest and root locking surfaces into frictional self-locking engagement. For cutting Dardelet internal threads a tap of the type shown at T in the drawings is commonly employed. The leading end portion of the tap is formed to develop the thread groove to full depth and following said portion is a helical series of four cutting edges C to trim the thread crest of the internal thread. These crest trimmers C are straight and materially wider than the thread crest to be trimmed and each is disposed at an angle of preferably six degrees to the axis of the tap. The trimmers develop a helicoidal locking surface upon the thread crest for locking coaction with the inclined root surface of a complementary male thread. A tap of this form comprises the subject matter of my U. S. Patent No. 1,846,408, dated February 23, 1932. It is most desirable that said thread crest locking surface be accurately formed, and my present invention is designed to facilitate accurate grinding of the crest trimmers C of the tap so that they will accurately cut said thread crest locking surface.

The tap grinding machine has a table top or bed 1 which carries the tap-supporting means, the grinding means and the device for comparing and measuring the tap while the latter is supported for grinding. The grinding means comprises an abrasive disk or wheel 2 having a beveled edge 3 whose inclination should correspond with that of the crest trimmers C to be ground. Said disk is supported by a pedestal 4 mounted in a fixed position upon the bed. A tap-supporting chuck 5 and adjustable tailstock 6 are carried by a base or carriage 7 slidably supported upon the bed by guides 8 for cross feed adjustment with reference to the grinding wheel. The chuck and tailstock are supported upon said base 7 for longitudinal oscillation to bring the crest trimmers C of the tap into proper relation to the grinding wheel. The mounting of the chuck and tailstock includes an upper slide 9 upon which the chuck and tailstock are directly mounted and a lower slide 10 slidably supporting the chuck and tailstock and in turn slidably supported by the base 7. Between the slides 9 and 10 and between the latter slide and the base 7 are guides 11. The tap comparing and measuring device is also adjustably mounted upon the base 7, as will be described hereinafter.

The chuck and grinding wheel are driven by a motor M mounted upon the bed 1. A drive gear 12 fixed to one end of the motor shaft meshes with a gear 13 fixed to a shaft 14. A worm 15 fixed to shaft 14 meshes with a worm wheel 16 fixed to a shaft 17. Another worm 18 fixed to shaft 17 meshes with a worm wheel 19 on a shaft 20. Fixed to shaft 20 is a bevel gear 21 in mesh with a bevel gear 22 fixed to a shaft 23. A bevel gear 24, also fixed to shaft 23, meshes with a bevel gear 25. Fixed to rotate with the latter gear is a gear 26, in mesh with a gear 27. Gear 27 meshes with a gear 28 fixed to the chuck. The worm wheel 19 is normally free to rotate upon the shaft and has a clutch member 29 engageable by a manually operable companion clutch member 29ª fixed to rotate with the shaft but slidable thereon. Engagement of said clutch members causes the chuck to be driven.

For driving the grinding wheel 2 the motor shaft is provided with a pulley 30. The grinding wheel is secured to a shaft 31 having a pulley 32, and a drive belt B operatively connects the pulleys 30 and 32. Means are provided for rocking the grinding wheel away from the tap after each grinding operation upon a tap land. For this purpose the shaft of the grinding wheel is rotatably supported by a drum 33, in a position below the center of the drum, and the drum is rotatably mounted in bearings 34 carried by the pedestal 4. Fixed to the drum is an arm 35 extending rearward and downward, and disposed beneath the rear end of said arm is a cam disk 36 fixed to the motor driven shaft 20. The arm has a contact pin 37 in engagement with the periphery of the cam and the cam has four high points 38 equally spaced therearound. A spring 39 anchored to the rear end of the arm 35 and to the bed 1 yieldably holds the pin 37 in contact with the cam. When a high point of the cam passes beneath the pin, the arm 35 is elevated, the drum 33 is rocked and the shaft of the grinding wheel, being eccentrically located in the drum, is shifted rearward slightly to move the grinding wheel away from the tap as the latter is rotated to bring another land in operative relation to the grinding wheel. As the high point of the cam passes from beneath the contact pin 37 the arm 35 is lowered by the spring 39 to rock the grinding wheel into position for grinding a succeeding land.

The four crest trimmers C on the tap lie in one turn of a helix and in order to bring the trimmers successively into grinding relation to the grinding wheel the tap is reciprocated to the required degree longitudinally. This is done by mechanically shifting the slide 10 which bears the chuck supporting slide 9. For shifting the slide 10 there is a cam disk 40 driven by the motor. This cam disk is mounted on a shaft 41 which bears the gears 25 and 26 and the cam and gears are fixed to the shaft so that the cam is rotatable along with said gears. The cam disk is provided with a cam face rising uniformly from a low point to a high point in approximately one complete turn around the cam axis and descending abruptly to the low point. A tappet arm 43 is rockably mounted upon the base 7 and has a free end interposed between the cam and a contact pin 43 at the inner end of the slide 10 and forming a thrust connection between the cam and said slide. The rise of the cam is equal to the pitch of the helix turn which includes the crest cutters C, and the cam and the tap are geared to rotate at the same rate, so that the tap is advanced axially correspondingly to the pitch advance of the successive crest trimmers C. The outward shift of the slide 10, for advancing the tap, is resisted by a spring 44 anchored to said slide and to a fixed anchorage. The cam 36 which controls the oscillation of the grinding wheel is so timed with relation to cam 40, which controls the chuck reciprocation, that while the contact pin 43 is descending to the low point of cam 40 and the spring 44 is retracting the chuck a high point of cam 36 will operate to hold the grinding wheel away from the tap as the latter is retracted.

In front of the chuck is the device for observing, comparing and measuring the crest trimmers C of the tap. This device includes a microscope directed toward the tap at a right angle to the axis thereof. The microscope is mounted for both vertical and horizontal adjustment with reference to the tap and it embodies comparing means for visual registration with a crest trimmer of the tap. Associated with the microscope are micrometer means to indicate the elevation of the microscope with reference to the tap axis.

The device has a base 45 secured to the cross-feed carriage or base 7 which carries the chuck. The base 45 has a depending apertured ear 46. A cross-feed screw 47 has a shank extending through the apertured ear and is rotatable therein but held against axial movement. Said screw is threaded through a nut 48 fixed to the bed 1 and has a hand wheel 49 at its forward end. By turning the screw, the carriage 7, together with the chuck and the comparing and measuring device, are bodily adjusted toward and from the grinding wheel. Mounted on the base 45 is a slide 50 supported by guides 51 to shift parallel with the chuck axis. The microscope and the micrometer, designated 52 and 53, respectively, are supported by the slide 50 upon an elevated medial portion 54 of the latter.

The structure of the micrometer includes a vertical tubular post 55 fixed to the raised portion 54 of the slide 50. A tubular barrel 56 is fitted to slide vertically upon the post but is held against rotation by a transverse pin 57. The latter extends through longitudinal slots in the post. A tubular member 58 has its lower end fitted within the upper end of the post and locked thereto as at 59. The upper end of said tubular member is internally threaded and the micrometer screw or spindle 60 is screwed therethrough. At its lower end the spindle bears against a ball 61 fitted in a recess in the cross pin 57. The upper end of the spindle bears a thimble 62 forming a knob and a tubular extension rotatably fitted upon the fixed tubular member 58. Fixed to rotate with the thimble is a knurled scale disk 63 bearing a micrometer scale 64 preferably graduated to thousandths or ten-thousandths of an inch. An index mark 65 upon the barrel 56 cooperates with said scale. Along the barrel there is a vertical scale 66 with graduations each representing one tenth of an inch. For cooperation with scale 66 there is a fixed pointer 67 mounted upon a post 68 fixed to the slide 50. The barrel of the micrometer is raised or lowered by grasping either the top thimble or the disk 63 and rotating it to turn the micrometer screw, and the degree of movement of the barrel is indicated by the scales 64 and 66.

The microscope is borne by the barrel of the micrometer and is vertically adjustable with it. The microscope is of a standard type. It has a tubular section 69 disposed horizontally and bearing the object lens, an oblique tubular section 70 bearing the eye-lens or eyepiece E and an elbow casing 71 joining said sections and containing the usual reflecting prisms, not shown. For the support of the microscope the micrometer barrel has an ear 72 at its lower end having a bore in which a cylindrical bar 73 is rotatably fitted at one end, as shown in Fig. 4. Said bar extends forward horizontally from the ear and has a barrel 74 fitted to slide longitudinally thereon but held against rotation by a transverse pin 74$^a$ extending through a slot in the bar. The forward end of the bar has a threaded bore in which is screwed an adjusting screw 75. The inner end of the screw 75 bears against a ball fitted in a recess in the transverse pin 74$^a$ and the outer end of the screw has a knurled knob. Interposed between the barrel 74 and the supporting ear 72 are compression springs tending to thrust the barrel outwardly. The barrel 74 bears a clamp for supporting the microscope. Said clamp comprises a lateral extension 76 upon the barrel forming one clamp section, and a clamp section 76$^a$. The clamp sections are formed to encircle the horizontal section of the microscope, and screws 77 joining the clamp sections serve to hold them clamped around the microscope. For properly supporting the clamp the barrel of the micrometer has a wide depending arm 78 formed at its lower end with a straight, accurately finished fore and aft guide track 79. Opposed to said arm is a depending arm 80 formed on the barrel 74 and having a pin 81 in contact with said guide track. The pin is held in contact with the track by the weight of the microscope and clamp. Thereby, the clamp and microscope are held in proper position. By turning the screw 75 the microscope is adjusted horizontally fore and aft for focusing and the pin 81 wipes along the track 79 and remains in contact with it in the different adjustments.

The microscope is supported for parallel vertical adjustment transversely of its objective line through adjustment of the micrometer, and the vertically adjustable barrel of the micrometer supports the microscope and the means for focally adjusting it. Beneath the barrel of the micrometer are compression springs 82 tending to elevate it. The microscope is also supported for parallel adjustment longitudinally of the chuck axis by shifting the slide 50 which forms a base and carriage for the micrometer and microscope. For the adjustment of said slide there is a lead screw 84, rotatably carried by the slide, fixed against longitudinal movement thereof and in threaded engagement with the base 45. Said screw has a knob provided with graduations 85, and the slide has a fixed pointer 86 cooperable with said graduations.

For visual comparison of the tap with an ideal or standard there is a comparator means embodied in the microscope. In the section 70 of the microscope, at a point spaced slightly inward from the eyepiece, there are two transparent circular glass disks 87 and 88 disposed face to face, and in accurate register with the eyepiece. These disks are mounted in a casing 89 joined into the microscope section 70 in any suitable manner. The disk 88 is fixed in the casing against movement, while the disk 87 is mounted for rotative adjustment upon the disk 88 about an axis coincident with the central visual line of the eyepiece. Upon its face opposed to disk 88 the rotatable disk bears a straight line 90 extending through the center of said face and through the center of the visual field of the eyepiece. The fixed disk 88 bears, upon its face opposed to the rotatable disk 87, a pair of straight lines 91 and an arcuate protractor scale 92 concentric with the axis of rotation of disk 87 and graduated and numbered to indicate ten degrees above a horizontal center line and ten degrees therebelow. The number of graduations may vary, however. The lines 91 intersect the horizontal center line and are similarly placed at opposite sides of the center and oppositely inclined. They converge upward and, in the present instance, each inclines at at angle of fourteen and one-half degrees to the vertical. For rotative adjustment of the disk 87 said disk has its circumference fixed in a circular frame 93 rotatably fitted in a fixed ring 94 and having a radial arm 95 projecting into a box-like extension of the casing 89. An adjusting screw 96 is screwed through one side of said casing extension and has a pointed inner end in contact with the radial arm 95, and a knurled operating knob 96ª at its outer end. A threaded thimble 97 is screwed into the opposite side of the casing and contains a plunger 98 and a spring 99 tending to thrust the plunger inward. The plunger has a pointed inner end held in contact with the radial arm 95 by the spring. When the adjusting screw is screwed inward the disk 87 and its line 90 are rotated in one direction against the resistance of the spring 99, and when the adjusting screw is unscrewed the spring, through the plunger 98, rotates the disk in the opposite direction. Thereby the line 90 is adjusted to different angles.

The chuck 5, at a point near its outer end, has a collar 100 fixed to rotate with it, and, adjacent said collar, there is a gear housing 101 fixed to the slide 9 upon which the chuck is mounted. Upon the periphery of the collar 100 is a scale including a central zero mark 102 and graduations to indicate several degrees of rotation of the chuck in opposite directions. A fixed pointer 103 upon the gear housing cooperates with said scale. At its tap-holding end the chuck has a radial mark 104 which is registrable with a radial mark 105 upon the end of the conical tap-holding member 5ª and the mark 105 is registrable with one of the cutting edges of the tap. This member has a tubular shank 5ᵇ receiving the tap shank and the outer end of said shank 5ᵇ is threaded and has a nut 5ᶜ screwed thereon. The conical member is slit for compression and when the nut is tightened against the adjacent end of the chuck the conical member is wedged into the opposite end of the chuck and is compressed to grip the tap. For adjustment of the chuck longitudinally into proper relation to the grinding wheel 2 the slide 9 bearing the chuck and tailstock is provided with a lead screw 106 rotatable and held against movement endwise of the slide, and in threaded engagement with slide 10. Said screw has an operating wheel 107.

In preparation for tap grinding the tap T is mounted in the conical tap-holding member 5ª of the chuck, with the cutting edge of one of the tap lands in register with the radial mark 105 of said member and the mark is registered with the mark 104 upon the end of the chuck body. After the tap and the holding member 5ª have been locked into the chuck by tightening the nut 5ᶜ the registered radial marks 104 and 105 are disposed vertically by manual rotation of the chuck to bring the scale mark "0" upon the chuck collar 100 into register with the fixed pointer 103. This registration indicates that the profile of the tap land is properly positioned for observation through the microscope. A hand wheel 108 upon the shaft 41 serves for manually rotating the chuck when the drive clutch is disconnected.

By turning the knob 96ª the comparator disk 87 of the microscope is adjusted to dispose the line 90 thereof at the proper inclination for comparison with a crest cutter C of the tap. The inclination of said line is accurately indicated by the scale 92, and the line and scale are observed through the eyepiece of the microscope and are magnified thereby. The microscope and the micrometer are so correlated to the chuck axis that when the horizontal objective line "0" of the microscope intersects the chuck axis the micrometer mark 65 of the micrometer, and the pointer 67 will register with the zero marks of the scales 64 and 66 respectively. By turning the micrometer screw the microscope is vertically adjusted to position its objective line at an elevation above the chuck axis corresponding to the ideal radial distance of a given point on a crest cutter C from the axis of the tap. This radial distance will vary with taps of different diameter and, the ideal distance for a tap of given diameter being known, the precise adjustment of the microscope in accordance with said distance will be indicated by the micrometer scales.

By turning the knob of the screw 84 the microscope is adjusted longitudinally of the chuck axis for registration with the crest cutter C positioned uppermost in the chuck for observation. In a Dardelet thread-cutting tap the groove-cutting teeth have slightly converging sides each making an angle of fourteen and one-half degrees with the tap axis, corresponding to the inclination of the comparator lines 91. In the tap shown each crest cutter C also has an abrupt side at its higher end whose inclination is also fourteen and one-half degrees. The microscope may be properly adjusted horizontally by visually registering one of the lines 91 with said abrupt side of the crest trimmer under observation, as indicated in Fig. 11. Or, when the crest trimmer is unprovided with such a side edge to serve as a guide said line 91 may be registered with a side of a groove-cutting tooth spaced along the tap from the crest trimmer. Then by turning the lead screw 84 the microscope may be adjusted the required distance along the tap to bring it in proper observational register with the crest trimmer. The scale 85 upon the knob of said lead screw serves to indicate this correct adjustment.

Having accurately positioned the microscope, with the comparator line 90 positioned properly both vertically and laterally, the cutting edge of the crest trimmer C is visually compared with said line, as indicated in Fig. 11, by observation through the microscope. The degree to which the cutting edge projects above the line 90 indicates the amount of grinding to be performed upon said edge to bring it to ideal size. As the grinding operation progresses the effect, greatly magnified, may be clearly observed through the microscope. If the edge produced is objectionably rough and the metal appears blue it is an indication that the grinding wheel needs refacing. My invention thus greatly facilitates accurate grinding of the tap. Heretofore, it has been extremely difficult to accurately measure the crest trimmers of Dardelet thread cutting taps because of the fact that the trimmers are arranged upon a helix. This renders them difficult to caliper. My invention enables them to be easily and quickly gauged with great precision and without the necessity of removing the tap from the chuck of the grinding machine.

The tap T is a long one designed for tapping nuts or other parts whose bores or holes to be tapped are open at both ends and permit the entering end of the tap to pass clear through. In such a tap the crest cutters incline toward the entering end of the tap. A Dardelet tap for cutting a thread in a bottomed hole, however, has its crest trimmers inclined inwardly away from the entering end of the tap. For comparing such crest trimmers the comparator line 90 is adjusted to an opposite inclination, as shown in Fig. 12.

What I claim is:

1. In combination, a mechanical tool device including a mounting to rotatably support a work piece, and a tool member mounted to operate upon the mounted work piece; a comparator device comprising a microscope, a mounting for said microscope supporting it for parallel bodily adjustment transversely of its objective line and of the axis of rotation of the work piece, said microscope mounting being correlated with said work piece mounting to support the microscope for observation of the work piece therethrough while the work piece is supported for operation of the tool thereon, and a comparing mark mounted in visual register with the eye-piece of the microscope for visual comparison of the work piece with said mark through the microscope; and means to indicate the transverse distance between the objective line of the microscope and the axis of rotation of the work piece in different adjustments of the microscope.

2. In combination, a mechanical tool device including a mounting to rotatably support a work piece, and a tool member mounted to operate upon the mounted work piece; a comparator device comprising a microscope, a mounting for said microscope supporting it and for parallel bodily adjustment transversely of its objective line and of the axis of rotation of the work piece said microscope mounting being correlated with said work piece mounting to support the microscope for observation of the work piece therethrough while the latter is supported for operation of the tool thereon, and a comparing mark mounted in visual register with the eyepiece of the microscope for visual comparison of the work piece with said mark through the microscope; and micrometer means to indicate the position of the microscope with relation to the work piece in different adjustments of the microscope.

3. In combination, a mounting to support a work piece for operation of a tool thereon; and a comparator device comprising a microscope, a mounting for said microscope supporting it for observation of the mounted work piece while the latter is supported for operation of the tool thereon, a comparing mark in visual register with the eyepiece of the microscope for comparison of the work piece with said mark through the microscope, and means rendering said mark rotatably adjustable in the visual field of the eyepiece; and means to indicate in the visual field of the microscope the degree of adjustment of said mark.

4. In combination, a mounting to support a work piece for operation of a tool thereon; a tool mounted to operate on the mounted work piece; and a comparator device comprising a microscope, a mounting for said microscope correlated with said work piece mounting to support the microscope for observation of the mounted work piece while the latter is supported for operation of the tool thereon, a comparing line mounted in the visual field of the eyepiece and extending through the center of the field and mounted for rotative adjustment to different angles in the field, and a scale in said field cooperable with said line to indicate the angular adjustments thereof, the line serving for comparison of the work piece therewith through the microscope.

5. In combination, a mounting to rotatably support a work piece for operation of a tool thereon; a tool mounted to operate on the mounted work piece; a comparator device comprising a microscope, a mounting for said microscope supporting it for parallel bodily adjustment transversely of its objective line and of the axis of rotation of the work piece, said microscope mounting being correlated with said work piece mounting to support the microscope for observation of the work piece therethrough while the work piece is supported for operation of the tool thereon, and a comparing mark mounted in visual register with the eyepiece of the microscope for visual comparison of the mounted work piece with said mark through the microscope; means to indicate the position of the microscope with relation to the work piece in different adjustments of the microscope; and index means cooperable with the work piece to indicate a proper rotative adjustment of the work piece upon its axis for observation and comparison of the work piece through the microscope.

6. In combination, a mounting to rotatably support a work piece for operation of a tool thereon; a tool mounted to operate upon the mounted work piece; a comparator device comprising a microscope, a mounting for said microscope supporting it for parallel bodily adjustment transversely of its objective line and of the axis of rotation of the work piece, said microscope mounting being correlated with the work piece mounting to support the microscope for observation of the mounted work piece therethrough while the work piece is supported in position for operation of the tool thereon, and a comparing mark mounted in visual register with the eyepiece of the microscope for visual comparison of the mounted work piece with said mark through the microscope; means to indicate the position of the microscope with relation to the work piece in different adjustments of the microscope; index means cooperable with the work piece to indicate a proper adjustment of the work piece upon its axis for observation and comparison of the work piece through the microscope; and means rendering said comparing mark adjustable in the visual field of the eyepiece.

7. In combination, a tap grinding machine including a mounting to rotatably support a tap for grinding operation thereon; a grinding tool mounted to operate on the mounted tap; comparator means comprising a microscope mounted for observation of the mounted tap while the latter is supported in its mounting in position to be operated thereon by the grinding tool, and a comparing mark cooperable with the microscope for comparison of a thread-cutting edge of the tap with said mark through the microscope; means rendering the microscope and comparing mark adjustable transversely of the axis of rotation of the tap in accordance with varying tap diameters; and means to indicate the degree of said microscope adjustment.

8. In combination, a tap grinding machine including a mounting to rotatably support a tap for grinding operation thereon, a grinding tool mounted for operation on the mounted tap, comparator means comprising a microscope mounted for observation of the mounted tap while the latter is supported in its mounting in position for grinding operation thereon, and a comparing mark cooperable with the microscope for comparing a cutting edge of the mounted tap with said mark by observation through the microscope, means rendering the microscope and comparing mark adjustable transversely of the axis of rotation of the tap in accordance with varying tap diameters; means to indicate the degree of said microscope adjustment; and means rendering the microscope and comparing mark adjustable longitudinally of the tap.

9. In combination, a tap grinding machine including a mounting to rotatably support a tap for grinding operation thereon, and a grinding tool mounted to operate on the mounted tap; comparator means comprising a microscope mounted for observation of the mounted tap while the latter is supported in its mounting in position for operation of the tool thereon, and a comparing mark cooperable with the microscope for comparing a cutting edge of the mounted tap with said mark by observation through the microscope; means rendering the microscope and comparing mark adjustable transversely of the axis of rotation of the tap in accordance with varying tap diameters; means to indicate the degree of said microscope adjustment; means rendering the microscope and comparing mark adjustable longitudinally of the tap; and means rendering the comparing mark adjustable relatively to the microscope to compare cutting edges at different angles to the tap axis.

10. In combination, a tap grinding machine including a mounting to rotatably support a tap for grinding operation thereon, and a grinding tool mounted to operate on the mounted tap; comparator means comprising a microscope mounted for observation of the mounted tap while the latter is supported in its mounting in a position for operation of the tool thereon, and a comparing mark cooperable with the microscope for comparing a cutting edge of the mounted tap with said mark by observation through the microscope; means rendering the microscope and comparing mark adjustable transversely of the axis of rotation of the tap in accordance with varying tap diameters; means to indicate the degree of said microscope adjustment; means rendering the microscope and comparing mark adjustable longitudinally of the tap; means rendering the comparing mark adjustable relatively to the microscope to compare cutting edges at different angles to the tap axis; and means to indicate the degree of said adjustment of the comparing mark relatively to the microscope.

11. In combination a tap grinding machine including a mounting to rotatably support a tap for grinding operation thereon, and a grinding tool mounted to operate on the mounted tap; a comparator device comprising a microscope, a mounting for said microscope supporting it for parallel adjustment transversely of its objective line and of the axis of tap rotation, said microscope mounting being correlated with said work piece mounting to support the microscope for observation of the work piece therethrough while the work piece is supported in its mounting in position for operation of the tool thereon, comparing means embodied in the microscope inward of the eyepiece and comprising a line extending through the center of the visual field of the eyepiece of the microscope for comparison of a cutting edge of the mounted tap with said line through the microscope, means supporting said comparing line for rotative angular adjustment in the visual field of the eyepiece, and scale means in said field and cooperable with said line to indicate by observation through the eyepiece the degrees of angular adjustment of the line; micrometer means to indicate the degree of adjustment of the microscope transversely of its objective line and of the tap axis; index means cooperable with the mounted tap to indicate when said cutting edge of the tap is correctly disposed with relation to the microscope for observation; and means to adjust the microscope longitudinally of the tap axis.

12. In combination, a tap grinding machine comprising a mounted grinding wheel, chuck means to rotatably support a tap for operative engagement by the grinding wheel, a base supporting the chuck means, and means for adjusting said base to move the chuck-supported tap toward and from the grinding wheel; and a comparator device mounted upon said base to shift therewith and comprising a microscope mounted in correlation to the chuck means for observing the tap through the microscope while the tap is supported in the chuck means in position to be ground by the grinding wheel, and a comparing mark cooperable with the microscope to visually compare the tap with said mark through the microscope.

13. In combination, a tap grinding machine comprising a mounted grinding wheel, chuck means to rotatably support a tap for operative engagement by the grinding wheel, a base supporting said chuck means, and means for adjusting the base to shift the chuck-supported tap toward and from the grinding wheel; a comparing and measuring device mounted upon said base to shift therewith and comprising a microscope mounted in correlation to the chuck means for observing the tap through the microscope transversely of the tap axis while the tap is supported in the chuck means in a position to be ground by the grinding wheel, a comparing mark embodied in the microscope inward of the eyepiece thereof and in the visual field of the eyepiece for visual comparison of the tap with said mark through the eyepiece, means for adjusting the microscope transversely of its objective line for observing taps of different dimensions, means to indicate the degree of said microscope adjustment, and means for adjusting the microscope upon said base longitudinally of the tap.

14. A machine for shaping an article by means of a tool said machine embodying devices for holding the article and means for relatively rotating the tool and said article holding devices, and means whereby the contour of the article may, while being shaped, be compared with a final, ideal shape or contour, said latter means embodying a microscope-appliance mounted so that its objective line is trained on said article at the zone of shaping, said microscope-appliance embodying a comparison-model outline of the final ideal contour of the zone whereon said objective line is trained and whereon the tool is working.

15. The structure recited in claim 14, said tool and said microscope being arranged at opposite sides of the article so that the tool as well as the microscope-appliance may be in use at the same time without disturbing the tool or its holding means.

16. A machine for shaping an article, embodying a rotatably mounted grinding wheel for shaping the article, rotatable devices for holding the article and rotating it at the grinding wheel, said wheel being located at one side of the axis of said rotating article, and means whereby the contour of the article may, while being ground to shape, be magnified in size and compared with a magnified predetermined perfect final shape or contour, said latter means comprising a microscope-appliance mounted so that its objective line is trained on the said article at the zone of shaping and adapted to bring into view thereon a portion of the contour of the article after it leaves the grinding wheel, said microscope-appliance embodying a comparison-model outline of the predetermined final contour of the zone whereon the grinding wheel is operating and said comparison-model outline being located for magnification by the microscope, whereby the contour of the article may be magnified and compared with the magnified comparison-model outline at any time during the grinding operation and while in grinding position.

17. A machine for shaping an article, embodying a rotatably mounted grinding wheel for shaping the article, rotatable devices for holding the article and rotating it at the grinding wheel said wheel being mounted at one side of the axis of said rotating article, and means whereby the contour of the article may, while being ground to shape, be magnified in size and compared with a magnified predetermined perfect final shape or contour, said latter means including a microscope-appliance mounted on the opposite side of the article from the grinding wheel and so located that its objective line is trained on said article at the zone of shaping and in which zone the grinding wheel is operating on the article, said microscope-appliance embodying a comparison-model outline of the predetermined final contour of the zone whereon the grinding wheel is operating, and said comparison-model outline being located for magnification by the microscope, whereby the contour of the article may be magnified and compared with the magnified comparison-model outline at any time during the grinding operation and while in grinding position.

18. In a machine including a mounting to support a work-piece for tool operation thereon and a tool mounted to operate on the mounted work piece, a comparator device including a microscope, a mounting for said microscope correlated with the work piece mounting to support the microscope for observation of the work piece while the latter is supported for operation of the tool thereon, and a comparing mark in visual register with the eyepiece of the microscope for visual comparison of the work piece with said mark through the microscope to gauge the effect of the tool operation on the mounted work piece.

19. In a machine including a mounting to support a work-piece for tool operation thereon and a tool mounted to operate on the mounted work piece, a comparator device including a microscope, a mounting for said microscope correlated with the work piece mounting to support the microscope for observation of the work piece while the latter is supported for operation of the tool thereon, and a comparing mark in visual register with the eyepiece of the microscope for visual comparison of the work piece with said mark through the microscope to gauge the effect of the tool operation on the mounted work piece; means to effect relative adjustment between the microscope and the work piece mounting transversely of the objective line of the microscope; and means to indicate the extent of said adjustment.

In testimony whereof I hereunto affix my signature.

ROBERT THOMSON.